March 18, 1952     J. L. DARNELL     2,589,605
BAKE PAN UNIT
Filed Jan. 14, 1950
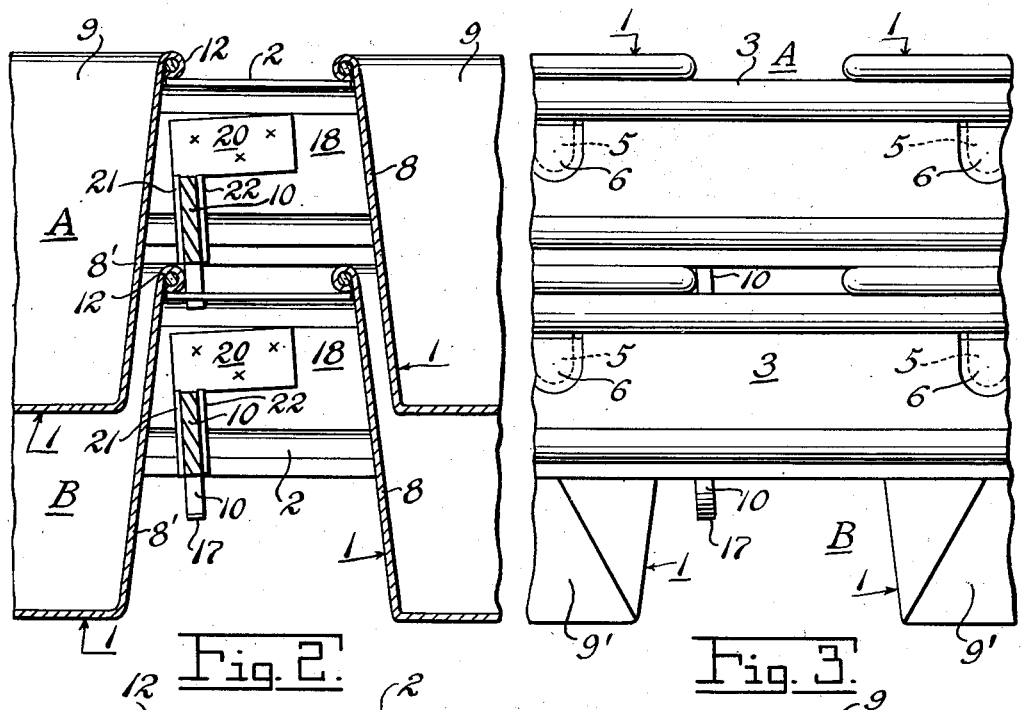
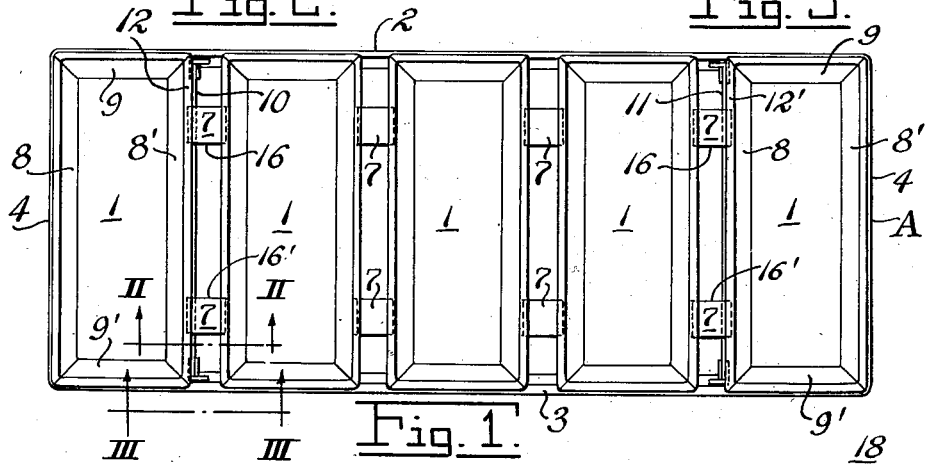
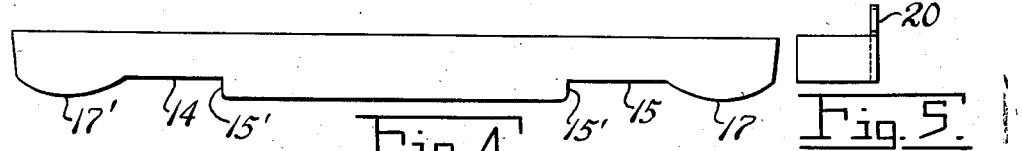
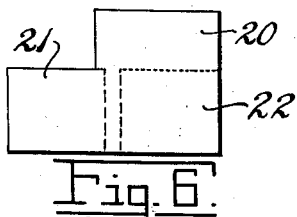
INVENTOR.
JESSE L. DARNELL
BY Zugelter & Zugelter
Attys.

Patented Mar. 18, 1952

2,589,605

UNITED STATES PATENT OFFICE 2,589,605

BAKE PAN UNIT

Jesse L. Darnell, Milford, Ohio, assignor to The Lockwood Manufacturing Company, Cincinnati, Ohio, a corporation of Ohio Application January 14, 1950, Serial No. 138,653

5 Claims. (Cl. 220—23.6)

This invention relates to bake pan sets of the type employed in commercial bakeries and more particularly to pan sets having means for maintaining the individual pans of said pan sets in spaced relation when a plurality of said sets are stacked one upon another.

Pan sets employed in commercial bakeries usually comprise a plurality of individual pans secured to either over or under-wire bands in spaced relation to each other. The side and end walls of individual pans are tapered from the top edges towards the bottom so that when a pan set is stacked upon another set, the portions of the pans below the bands extend into or nest within the pans of the set below it. When pan sets are stacked, the bands rest upon the rims of the end walls of the pans, in under-wire banded sets, or upon the bands of the set below in over-wire banded sets. When pan sets are stacked, they should be held in spaced relation and locked against both lateral and longitudinal movement to prevent rubbing of the pans against each other. The surfaces of the pans are thereby protected. The pan sets should also be so locked and braced when stacked, that the stack will not shift out of plumb when moved from place to place in a bakery.

An object of this invention is to provide a bake pan set with means for preventing lateral and longitudinal movement thereof when it is stacked upon another similar bake pan set.

Another object of the invention is to provide a bake pan set with means which when a pan set is stacked upon another, holds the body portions of the pans of the sets in spaced relation to each other.

The above and other objects and features of the invention will be apparent to those skilled in this art from the following description taken in conjunction with the accompanying drawings, in which:

Figure 1 is a top plan view of stacked bake pan sets, in which the individual pan sets are arranged and constructed in accordance with an embodiment of the invention;

Fig. 2 is an enlarged view in section taken on line II—II of Fig. 1;

Fig. 3 is an enlarged fragmentary end view of a portion of the stacked pan sets as seen looking in the direction of line III—III of Fig. 1;

Fig. 4 is a view in side elevation of a spacing and locking bar embodied in the pan sets of Figs. 1, 2 and 3;

Fig. 5 is a view in side elevation of a mounting clip for the spacing and locking bars; and Fig. 6 is a view in elevation of a blank from which the clip of Fig. 5 is made.

Throughout the drawings and the specification like reference characters indicate like parts.

In Figs. 1, 2 and 3 of the drawings a stack of similarly constructed bake pan sets A and B embodying a form of the invention are shown. Each bake pan set comprises a plurality of individual pans 1 which are secured as a unit to end bands 2 and 3 and side bands 4, the end bands and side bands embracing the units. The individual pans may be secured to the end bands in any suitable manner as with rivets or by means of lap clinches as disclosed in the copending application of Jesse L. Darnell and Elbert M. Cormack, Serial No. 98,084, filed June 9, 1949. Also, pans 1 may be constructed in the same manner as the pans of that application are constructed. I prefer the lap clinch attachment of the above mentioned application to rivets. In the lap clinch attachment the end bands are provided with a pair of inwardly disposed and downwardly projecting tabs 5 for each pan. These tabs extend behind the respective fold-flaps 6 at each pan end. These tabs and flaps are squeezed together after assembly so that the pans are firmly secured to the bands.

The pan sets are also provided with cross-braces 7. These braces as shown are secured to adjacent top edges of the side walls of adjacent pans, there being two cross-braces per pair of pans, although a large number may be used if the length of the pans require additional cross-bracing.

As shown in Fig. 2, the cross-braces are attached to the underside of the rolled top edges of the side walls of the pans. Also, as shown by Figs. 1, 2 and 3, the side and end walls 8—8' and 9—9' of the respective pans taper or slope inwardly from the top edges to the bottom thereof, so that when one pan set is stacked upon another the walls of the portions of the pans below the bands 2 and 3 are spaced from the walls of the pans within which they are nested, see Fig. 2.

In order to hold the pan sets in the spaced relation shown in Fig. 2, when pan sets are stacked, and also to prevent relative longitudinal and lateral movement of the pan sets, means are provided for locking the nested pan sets in the spaced relationship shown in Fig. 2. The locking means comprises a pair of bars 10 and 11. I prefer to locate the bars adjacent the innermost edges of the outermost pans in a set as shown in Fig. 1.

Bar 10 is secured at its opposite ends to the end bands 2 and 3 at such a location that the lower edge of the bar is below the lower edges of the end bands and in substantially vertical alignment with the edge 12 of the pan. I prefer to mount bar 10 so that it is inclined at an angle and in a plane substantially parallel to side wall 8 of the pans. Thus when a pan set is stacked on another set the bar lies against the edge 12 of the pan in the set immediately below.

Bar 11 is similar to bar 10 and is mounted on the end bands 2 and 3 in the same manner. However, bar 11 is inclined in the opposite direction so that it lies in a plane substantially parallel to side walls 8' of the pans. By so inclining bars 10 and 11 the lowermost edges thereof will clear the edges 12 and 12' of the pans in the lower set and guide the pan sets into place.

Since bars 10 and 11 of one pan set bear against edges 12 and 12' of the outermost pans in a pan set immediately below it, the pan sets cannot move laterally, that is to the right or left, relative to one another. To prevent movement of the pan sets relative to one another in a direction longitudinally of the individual pans 1, bars 10 and 11 are provided with notches 14 and 15 located to receive the cross-braces 7 therein. The inner edges 15' of these notches abut the inner edges 16 and 16' of the braces, and the pans of a unit are thereby locked against movement in either direction longitudinally of the pans. To facilitate sliding of a pan unit into place when stacking them, the portions of bars 10 and 11 between the notches and the ends thereof may be bowed or arched downwardly as at 17 and 17' to form skids or runners. These skids or runners slide over the braces 7 as a pan unit is stacked on another unit. Ordinarily, stacking is done by placing one side thereof on which an end band 2 or 3 is secured over the opposite side of the lower pan unit and then sliding it into place. When sliding into place, the skids ride over the cross-braces without doing damage to them.

The depth of each notch 14 and 15 is such that the bars do not rest on the cross-braces to avoid imposing the weight of a stack of pans on the braces in the lowermost units in a stack.

The bars 10 and 11 may be secured to end bands 2 and 3 in many ways, however I prefer to secure them by means of clips 18 such as shown in Figs. 2 and 3.

Each clip 18 comprises a back 20 which is secured to the end bands preferably by welding it thereto, and spaced forwardly projecting tabs 21 and 22. The ends of the bars are received between tabs 21 and 22 and are secured thereto by welding or other suitable means. By employing the clips 18, manufacture and installation of the spacing and locking bars 10 and 11 is greatly simplified, whereas if the ends of the bars were flanged, the flanges would require special design for pan sets having different design or construction of end bands.

Having thus described the invention, it will be apparent to those skilled in this art that various modifications and changes may be made therein without departing from either the spirit or the scope of the invention.

Therefore what I claim as new and desire to secure by Letters Patent is:

1. A pan unit comprising a plurality of spaced pans said unit being adapted for stacking upon another unit with the pans thereof nesting in the pans of another pan unit, each of the pans of said unit having side and end walls tapering from the top to the bottom thereof, bands extending across the ends of said pans and secured thereto to hold said pans together as a unit, cross-braces secured to adjacent top edges of adjacent pans, a bar secured at its ends to said end bands and extending parallel to and lying substantially in the vertical plane containing a top edge of one of the pans of the unit, a second bar secured at its ends to said bands and extending parallel to and lying substantially in the vertical plane containing the opposite top edge of a different pan of the unit, the lower edges of the portions of the bars between said ends being at a level below the lowermost edges of said bands, said bars having notches in their lowermost edges corresponding in location to said braces, said bars and the notches therein cooperating with the cross-braces of said other unit to space the individual pans of a unit from the pans of said other unit when nested therein and hold said pans against longitudinal and lateral movement when a pan unit is stacked upon another unit.

2. A pan unit according to claim 1 characterized by the fact that said bars are disposed respectively adjacent the inside edges of the outermost pans of a unit.

3. A pan unit according to claim 1 characterized by the fact that the ends of the bars are secured to clips each of which clips has a back secured to the end bands and a pair of spaced tabs between which the end of a bar is received and to which the bar is secured.

4. A pan unit according to claim 1 characterized by the fact that the lower edges of the portions of the bars between the notches and the ends thereof are downwardly arched to form skid surfaces to facilitate sliding of a pan unit into another pan unit when stacking the same.

5. A pan unit according to claim 1 characterized by the fact that adjacent edges of adjacent pans are connected by cross-braces disposed one adjacent each end of each pan and that each bar is provided with a notch adjacent each end thereof disposed to receive the respective braces of another pan unit, and that the lower edges of said bars between the notches and the ends thereof are downwardly bowed to form skid surfaces to facilitate sliding of a pan unit into another pan unit when stacking the same.

JESSE L. DARNELL.

REFERENCES CITED

The following references are of record in the file of this patent:

UNITED STATES PATENTS

| Number | Name | Date |
| --- | --- | --- |
| 1,477,249 | Debs | Dec. 11, 1923 |
| 1,678,008 | Jackson | July 24, 1928 |
| 2,073,892 | Ward | Mar. 16, 1937 |